United States Patent [19]
Blank

[11] Patent Number: 4,880,455
[45] Date of Patent: Nov. 14, 1989

[54] METHOD FOR THE MANUFACTURE OF SLOW-RELEASE FERTILIZERS

[75] Inventor: Itzhak Blank, Haifa, Israel

[73] Assignee: Haifa Chemicals Limited, Haifa, Israel

[21] Appl. No.: 160,633

[22] Filed: Feb. 26, 1988

[30] Foreign Application Priority Data

Mar. 24, 1987 [IL] Israel ............................................ 81975

[51] Int. Cl.$^4$ .......................... C05C 9/00; C05C 11/00; C05G 5/00; C05B 7/00
[52] U.S. Cl. .............................................. 71/28; 71/33; 71/34; 71/64.07; 71/64.11; 71/64.13
[58] Field of Search ................. 71/64.01, 64.03, 64.07, 71/64.11, 64.12, 64.13, 27, 1, 11, 28–30, 33–36

[56] References Cited

U.S. PATENT DOCUMENTS

| | | | |
|---|---|---|---|
| 3,096,171 | 7/1963 | Woerther | 71/64 |
| 3,158,462 | 11/1964 | Wilson | 71/4 |
| 3,223,518 | 12/1965 | Hansen | 71/64.07 |
| 3,242,237 | 9/1966 | Belak et al. | 264/13 |
| 3,259,482 | 7/1966 | Hansen | 71/64 |
| 3,264,089 | 8/1966 | Hansen | 71/64 |
| 3,285,223 | 11/1966 | Sahlin | 71/64.07 |
| 3,321,298 | 5/1967 | Bidlack, Sr. et al. | 71/64 |

OTHER PUBLICATIONS

Soybeans, Chemistry & Technology, 1978, Smith, pp. 74–75.

*Primary Examiner*—Ferris H. Lander
*Attorney, Agent, or Firm*—Morgan & Finnegan

[57] ABSTRACT

A method for the manufacture of physically prepared slow-release fertilizer by coating fertilizer particles with at least one layer of a substantially water insoluble polymer possessing a three dimensional structure. The three dimensional structure results from a prepolymerized crosslinked unsaturated oil having between 12 to 20 carbon atoms and a iodine value of at least 120, the extent of crosslinking being above 5%. Optionally, the coating layer contains micronutrients and inert materials. In a preferred embodiment, the coating consists of three layers, the first being obtained with a high viscous unsaturated oil and the subsequent two layers with a lower viscosity unsaturated oil. The method is applicable for most of the known water-soluble fertilizers.

14 Claims, No Drawings

METHOD FOR THE MANUFACTURE OF SLOW-RELEASE FERTILIZERS

The present invention relates to an improved method for the manufacture of slow-release fertilizers. More particularly, the invention relates to an improved method for the manufacture of physically prepared slow-release fertilizers possessing the property of releasing the fertilizers after long periods of time.

BACKGROUND OF THE INVENTION

It is a well-known fact that no fertilizer, of whatever composition, is ever utilized by the crop with a complete efficiency. This occurs particularly with nitrogen-based fertilizers, although it is encountered also with all water-soluble fertilizers. The main reason for this deficiency is the rapid dissolution of the fertilizer in the soil, where only a part thereof is actually utilized, the balance being lost in the draining of rain or irrigation water. Two main solutions were suggested to overcome this disadvantage:

(a) use of chemically prepared slow-release fertilizers, such as ureaform, isobutylidene diurea, oxamide etc., and (b) use of physically prepared slow-release fertilizers, by coating the fertilizer granules with sulfur, wax or synthetic polymers, which decrease the removal of the fertilizer from the soil by rain or irrigation water.

The disadvantage of the chemically prepared slow-release fertilizers is mainly connected with their coats, since quite expensive raw materials and/or manufacturing costs are involved. Thus for instance, in case of nitrogen-based fertilizer, it was stated that using nitrogen compounds of reduced solubility is at least twice as costly as using standard soluble nitrogen fertilizers.

Whereas the present invention deals with physically prepared slow-release fertilizers, more discussion and relevant prior art references will be presented on this approach.

PRIOR ART REFERENCES

The literature is quite abundant with many references, patents and reviews, describing the method of producing physically prepared slow-release fertilizers. The general idea is to provide an insoluble coating on granules of water-soluble fertilizers. A variety of materials have been found suitable for coating purposes, the most important of these being wax, sulfur and organic polymers of different types. Among the polymers the following are mentioned: copolymers of dicyclopentadiene and glyceryl ester of an unsaturated organic acid (U.S. Pat. No. 3,223,518); epoxy-polyester resin (U.S. Pat. No. 3,259,482); urethane coating (U.S. Pat. No. 3,264,089; polystyrene coating (U.S. Pat. No. 3,158,462).The main advantage of the organic polymers is their relatively high costs which render them not to be economically feasible to use for a cheap product such as fertilizer. The mechanism by which the polymer acts is as follows: the polymer coats the particles of fertilizer with a skin or glove which skin persists on the granules until substantially all the water soluble material has been leached out.

The use of sulfur coating is encountered mainly with urea, where it has been shown too have significant advantages over conventional fertilizers on certain crops. A typical discussion describing in a detailed manner this method is given in two papers by Lynch T.B.(1) and by Meisen and Mathur (2) presented at the British Sulphur Corporation (Second International Conference on Fertilizers, London, Dec. 4-6, 1978). The main disadvantage of sulfur is the fact that it was found not to be adequately resistant to moisture penetration. Accordingly, addition of an oily-wax sealant over the sulfur coating is required. Also, sulfur can not be utilized in fertilizers containing nitrate where explosive compositions might result.

The use of wax is the most popular coating for various water-soluble fertilizers. An improved method is described in U.S. Pat. No. 3,242,237. The method involves the formation of a fluid dispersion of the water-soluble fertilizer in molten wax and then dropping such dispersion in the form of droplets into water. As each droplet of the fluid dispersion contacts the water, it immediately solidifies and becomes a solid particle comprising a dispersion of solid fertilizer in solid wax. One disadvantage of using wax-coated fertilizer is that the wax content of the coated fertilizer must often be quite high in order to provide a satisfactory reduction in the rate at which the fertilizer is released to the plant. In areas of relatively heavy rainfall, wax contents in the order of 50% may be necessary. Such quantities of wax make the use of fertilizer quite expensive.

The use of plant-derived wax such as palm, carnauba or sugar cane as the coating material, instead of paraffin, is described in U.S. Pat. No. 3,096,171. It is claimed that in certain respects these compounds are superior to paraffin wax for coating purposes.

Finally, tung oil (called also wood oil) is suggested as a coating to provide an effective slow-release fertilizer (U.S. Pat. No. 3,321,298). The advantage claimed for this oil is the fact that it does not necessitate the use of flammable solvents. As known, tung oil is a drying oil obtained from the seed of the tung tree and consists of glycerides that polymerize to a hard gel on heating. For optimum results, it is suggested to incorporate small amounts of driers prior to the oil application. Examples of such driers are lead, manganese and cobalt salts, as used generally in the art of paint and varnish manufacture.

The above brief review clearly indicates the great interest attributed in the last forty years to the object of providing slow-release fertilizers. This interest becomes more accentuated in these days, when the costs of the fertilizers and their application to the soil increase significantly.

SUMMARY OF THE INVENTION

It is an object of the present invention to provide a method for the manufacture of physically prepared slow-release fertilizers. It is another object of the present invention to provide a simple method for the manufacture of slow-release fertilizers, the release of the fertilizers occuring after long periods of time. It is yet another object of the present invention to provide a simple method for the manufacture of slow-release fertilizers, without utilizing organic solvents. Thus, the invention consists of a method for the manufacture of physically prepared slow-release fertilizers wherein the fertilizers particles are coated by at least one layer of a substantially water-insoluble polymer possessing a three-dimensional structure, resulting from a prepolymerized crosslinked unsaturated oil having between 12 and 20 carbon atoms and a iodine value of at least 120, the extent of crosslinking of the coating polymer being at least 5%.

It has unexpectedly been found that grunules coated even by one layer obtained according to the above method possessing the three dimensional structure are very strong and possess enhanced hydrophobic properties. Accordingly, the granules will remain stable and will release the fertilizers over prolonged periods of time. In addition to the prepolymerized unsaturated oil, catalyst and crosslinking agent, one or more inert fillers are suggested to be incorporated during the coating operation, as commonly utilized in the art.

DESCRIPTION OF THE PREFERRED EMBODIMENTS

The crosslinking of the above prepolymerized unsaturated oils, proceeds at high temperatures and can be stopped at any desired stage by lowering the temperature to the ambient one. The degree of polymerization is generally controlled by measuring the viscosity of the oil. Thus oils having a viscosity from a few centipoise to more than 50,000 centipoise can easily be obtained in practice and this will allow a great flexibility to the method according to the present invention. A high viscosity oil will give a very thick coating layer which might be quite not uniform without covering completely all the granule surface. A less viscous oil will effectively seal any cracks or imperfections on the granule surface, but might penetrate too much into the core of the granule and by its lubricating effect will weaken the compression strength of the granule. According to a preferred embodiment, it is suggested to provide a two-layers coating: first a coating with a high viscosity unsaturated oil and subsequently a second layer with a lower viscosity unsaturated oil which will cover and seal any existent imperfections on the granule surface. In this manner, the method according to the present invention might not require the usual step of coating the granules with parrafin wax layer.

The unsaturated oils suitable for the present invention, possessing between 12 and 20 carbon atoms, are commercially available in bulk being quite inexpensive. Typical examples of such oils are: linseed oil, safflower oil, sunflow oil, dehydrated castor oil, soya oil etc. All these oil comprise as a main component glycerides of the corresponding organic acids, such as oleic, linoleic and linolenic acid. A most preferred oil will consist of prepolymerized linseed oil, which is a mixture of the triglycerides of oleic, linoleic and linolenic acids. Various types of linseed oil can be used, such as crude and refined, blown, alkali refined and stand oil. Also various mixtures of propolymerized oils can be used such as mixtures of linseed oil with wood oil oiticica oil or dehydrated castor oil. The unsaturated oil will serve a dual purpose, first as a vehicle for any additives and fillers to be incorporated in the coating composition and finally as the main coating element to render the three dimensional structure after the crosslinking stage.

The unsaturated fatty ester to be utilized in the method according to the present invention should be in a prepolymerized stage having a viscosity of at least 40,000 centipoise and preferably in the range of between 30,000–50,000 cps (as measured by Brookfield viscosimeter Spindle 4, 12 RPM).

In order to accelerate the polymerization, it is suggested to incorporate known catalysts such as peroxides, diazo compounds, and known metal salts such as metal salt of 2-ethyl hexoic acid. The crosslinking agents to be utilized can be any of the known in the art such as esters of acrylic acid or methacrylic acid containing two or more unsaturated groups such as for example ethylene glycol diacrylate or pentaerythritol triacrylate, allyl compounds such as diallyl and triallyl glycerine, triallyl sucrose, divinyl benzene etc. The amount of crosslinking agent to be used has to be in the range of 0.1% to 2% by weight of the unsaturated oil and is preferably from 0.3% to 1%. Amounts of crosslinking agents below 0.1% will not produce the desired strength effect of the coating. On the other hand, amounts of crosslinking agents in excess of 2% by weight will not improve crosslinking of polymer. The degree to which the polymer is crosslinked will determine the extent to which the surface of the granule is transformed into a three-dimensional structure.

It was found that the minimal extent of crosslinking of the prepolymerized unsaturated oil is 5% and preferably above 10% in order to impart the desired strength to the coating. It was found that in this case, the coating of the fertilizer granules will possess an adequate three-dimensional structure, capable to of withstanding for prolonged periods of time the effects of moisture and soil microorgansms.

Various organic or inorganic fillers can also be incorporated in the unsaturated oil, prior to the crosslinking stage, such as wood flour, cellulose, bentonite, talc, powder phosphate rock or other similar inert materials. The amount of these fillers is between 20% to 80% and preferably between 40% to 60% of the unsaturated oil. It is also possible to incorporate in the oil phase, plasticizers and other film-modifying compounds such as dioctyl phthalate, dibutyl phthalate, dioctyl sebacate, isopropyl miriatate, stearates, and similar compounds well-known in the art. Trace elements and nutrients can also be added to the oil-phase, special attention that they are paid to be stable and resistant to the temperature at which the coating is carried out.

In addition to the improved slow-release property of the products obtained according to the present invention, it was found that the coated granules produced possess excellent storage and handling characteristics and might even be handled in bulk in a humid climate.

The rate of nutrient release and release period time can be varied by the selection of the coating constituents, coating thickness and of course the particular fertilizer used. Accordingly, a great flexibility in formulations can be achieved. The release of nutrients from the coated particles is initiated by movement of water vapor through the coating which will dissolve the soluble core and subsequently the nutrients in solution will diffuse outward through the coating into the soil.

The slow-release fertilizer granules obtained according to the present invention possess many advantageous characteristics. First, they will reduce the damage to plants, by a rigorous control of the fertilizer to be released from the coated granule, due to the avoidance of high local concentrations of the soluble fertilizer material. By a proper selection of the extent of crosslinking in the coating, the numbers of layers as well as the thickness of each layer, it will be possible to regulate the exact release of the fertilizer. Moreover, it will also be possible to release the exact amount according to the growth of the plant. Thus for instance a slow-release of nitrogen will be desirable when the plant is young and small, and a fast-release when it is growing rapidly. In this manner the method enables to obtain a "tailor-made" slow-release fertilizer.

Another advantage of the method according to the present invention, is the possibility to obtain the granules of the coated fertilizer at the desired size. It is possible to start with a mixture of granules of various sizes, the coating being carried out in the same vessel and subsequently to separate them by sieving.

The particle size of the coated fertilizer granules may vary applicable, but are preferable below about 5 mm diameter. Most preferably the praticle size of the pellets are in the range of between 1 to 5 mm diameter. It should also be pointed out that the pellets may be also in the form of any other geometric configuration (pills, cylinder etc.) and not only beads or granules, although the latter is preferred.

The fertilizer to be coated according to the present invention may be selected from the well-known water soluble fertilizers such as: potassium nitrate, potassium sulfate, urea, ammonium nitrate, monopotassium phosphate, ammonium phosphate, mixtures of N:P:K fertilizers etc., provided that they can withstand the temperature required for the crosslinking polymerization.

The invention will be hereafter illustrated by a number of Examples, it being clearly understood that no limitation should be implied, since many variations could be conceived without being outside the scope of the present invention.

The concentrations given in the Examples are by weight, unless otherwise stated. The measurements of viscosity were carried out in a Brookfield viscometer, using spindle No. 4 at 12 rpm.

The crosslinking degree was determined by swelling method (M.L. Miller, The structure of polymers, 1968, Reinhold N.Y., page 327) using n-hexane, comparing the prepolymerized oil with the crosslinked polymer coating.

EXAMPLE 1.

80 parts of Potassium Nitrate in the form of granules were put on a heated rotating pot. To the rotated pot there were added gradually 5 parts of prepolymerized stand oil (viscosity 4000 cps) containing 0.1 parts of Divinyl Benzene and 0.02 parts of Lauroyl peroxide. An amount of 13.9 parts of talc were added to prevent agglomeration of the granules. The pot was heated by means of a gas burner located so as to obtain a temperature of about 160°–180° C. The rotating pot was kept until the polymerization of the oil was complete. After the granules were cooled the process was repeated.

The crosslinked polymer coating swelled 21% less than the starting prepolymerized stand oil (determined in n-hexane).

An amount of 5 g of the coated granules of potassium nitrate obtained were put in an Erlenmeyer flask containing 50 ml of water. After 7 days the granules had released 10.7% of the initial nitrate content into the water, and after 14 days 23.4%.

EXAMPLE 2.

500 g Potassium Nitrate granules were heated on a rotating pan together with 7.6 g prepolymerized stand oil (as described above) 0.1 g Divinyl Benzene, 0.04 g Lauroyl Peroxide and 21.2 g talc.

The process was repeated to obtain a second coat with the same composition. A third coat was also made using a lower viscosity stand oil (3000 cps). This oil will effectively seal any small cracks or fissures in the previous coatings. The compression strength of the granules obtained was about 2300 kg/cm$^2$.

The crosslinked polymer coating swelled 19% less than the starting prepolymerized stand oil (determined in n-hexane).

The finished coated granules were tested for leaching of the fertilizer in water. The results obtained are given in the following Table 1.

TABLE 1

| | Amount of potassium nitrate released from granules with a three layers coating. | | | | | |
|---|---|---|---|---|---|---|
| Hours | KNO$_3$ released (% of initial) | Hours | KNO$_3$ released (% of initial) | Hours | KNO$_3$ released (% of initial) |
| 2 | 1.6 | 408 | 29.8 | 888 | 35.5 |
| 4 | 3.7 | 432 | 30.3 | 912 | 35.6 |
| 6 | 6.8 | 456 | — | 936 | 35.7 |
| 8 | 10.8 | 480 | 31.4 | 960 | — |
| 24 | 12.4 | 504 | 31.9 | 984 | 35.9 |
| 48 | 14.8 | 528 | 32.3 | 1008 | 36 |
| 72 | 15.9 | 552 | 32.7 | 1032 | 36.06 |
| 96 | 17.1 | 576 | 33.1 | | |
| 120 | — | 600 | 33.3 | | |
| 144 | 20 | 624 | — | | |
| 168 | 21.4 | 648 | 33.8 | | |
| 192 | 22.6 | 672 | 34 | | |
| 216 | 23.6 | 696 | 34.2 | | |
| 240 | 24.6 | 720 | 34.5 | | |
| 264 | 25.5 | 744 | 34.7 | | |
| 288 | — | 768 | 34.9 | | |
| 312 | 27 | 792 | — | | |
| 336 | 27.5 | 816 | 35.2 | | |
| 360 | 28.3 | 840 | 35.3 | | |
| 384 | 29.1 | 864 | 35.4 | | |

EXAMPLE 3.

500 g of Potassium Nitrate granules were heated on a rotating pan together with 15 g soya oil (Iodine value =135) prepolymerized to a viscosity of 40000cps mixed with 0.2 g Lauroyl Peroxide and 0.1 g Divinyl Benzene.

Separately 35 gr of talc were added to keep the mixture free flowing while heating the mixture to 180° C. for one hour.

A second coat was made in a similar manner but using 10 g of prepolymerized soya oil, 0.2 Lauroyl peroxide, 0.1 Divinyl Benzene and 25 g talc.

A third coat was similarly made using 15 g of prepolymerized soya oil, 0.2 g Lauroyl peroxide, 0.1 Divinyl Benzene and 25 g of talc.

The crosslinked polymer coating swelled 19% less than the starting prepolymerized soya oil (determined in n-hexane).

The resulting granules were tested for the leaching of the fertilizer, when left in water for 72 hours the granules released 6.4% of the initial Potassium Nitrate presented therein.

EXAMPLE 4.

500 g of Potassium Nitrate granules were heated on a rotating pan together with prepolymerized safflower oil (Iodine value 150), 7.6 g Divinyl Benzene, 0.1 g Lauroyl Peroxide and 21 g talc. Three coats were made keeping the temperature at 160 - 180° C. during one hour each time.

The crosslinked polymer coating swelled 19% less than the starting prepolymerized safflower oil (determined in n-hexane).

After 24 hours immersion in water these granules release only 3.3% of Potassium Nitrate present therein.

EXAMPLE 5.

500 g Potassium Nitrate were coated with prepolymerized linseed oil containing (by weight) 20% Paraffin wax, 7.5 g Divinyl Benzene 0.1 g Lauroyl Peroxide, 0.06 g and Talc 21 g. Two coats were made, the third one being made with low viscosity (3000 cps) prepolymerized linseed oil.

The crosslinked polymer coating swelled 19% less than the starting prepolymerized lin seed oil (determined in n-hexane).

These granules released, after 24 hours immersion in water only 1.8% of the Potassium Nitrate present therein.

EXAMPLE 6.

100 g of a NPK fertilizer mixture (17:17:17) in the form of granules were heated in a rotating pot. To the rotated pot the following reagents were gradually added: 2 g of prepolymerized stand oil (as in Example 1), 0.07 g of divinyl benzene, 0.015 g of lauroyl peroxide and 4 g of talc. The temperature of the mixture was kept at 150°-170° C. for about one hour.

The process was repeated twice using each time 3 g of oil, 0.01 g of lauroyl peroxide and about 10 g of talc. The coated granules released 42.6% of their $P_2O_5$ content after 8 hours in water and 60% after 96 hours.

EXAMPLE 7.

The experiment as in Example 6 was repeated, using the same reagents and conditions but the fertilizer used was monoammonium phosphate.

The coated granules released 45.1% of the $P_2O_5$ after 8 hours in water and 71% after 96 hours.

EXAMPLE 8.

The experiment as in Example 6 was repeated, using the same reagents and conditions, but the fertilizer used was monopotassium phosphate.

The coated granules released 33.9% of the $P_2O_5$ after 8 hours in water and 79.4% after 96 hours.

I claim:

1. A method for the manufacture of physically prepared slow-release fertilizers wherein fertilizer particles are coated by at least one layer of a substantially water-insoluble polymer possessing a three-dimensional structure, resulting from the crosslinking at a temperature in the range of 160° C. to 180° C. of a prepolymerized crosslinked unsaturated oil having between 12 to 20 carbon atoms and an iodine value of at least 120, the extent of crosslinking being above 5% gel, wherein catalysts and crosslinking agents are added during the crosslinking polymerization.

2. A method according to claim 1, wherein said coating consists of three layers, the first obtained with a high viscous unsaturated oil and the subsequent two layers with a lower viscosity unsaturated oil.

3. A method according to claim 1, wherein the extent of crosslinking is above 10% gel.

4. A method according to claim 1, wherein said unsaturated oils are selected from the group consisting of linseed oil, safflower oil, sunflower oil, stand oil, dehydrated castor oil, and soya oil.

5. A method according to claim 4, wherein the viscosity of the unsaturated oil is at least 40,000 centipoises.

6. A method according to claim 1, wherein said catalysts are selected from peroxides, diazo compounds, and metal salts of 2-ethyl hexoic acid.

7. A method according to claim 1, wherein said crosslinking agents are selected from esters of acrylic acid or methacrylic acid containing two or more unsaturated groups.

8. A method according to claim 7, wherein the amount of crosslinking agent is between 0.3% to 1% by weight of the unsaturated oil.

9. A method according to claim 1, wherein fillers and micronutrients are incorporated during the crosslinking polymerization.

10. A method according to claim 9, wherein said fillers are selected from wood flour, talc, bentonite and phosphate rock.

11. A method according to claim 10, wherein the amount of filler is between 20% to 80% by weight of the unsaturated oil.

12. A method according to claim 1, wherein the coating is carried out on small particles of fertilizer producing the coated granules thereof.

13. A method according to claim 12, wherein the particle size of the granules is in the range of between 1 to 5 mm.

14. A method according to claim 1, wherein the fertilizer is selected from the group consisting of potassium nitrate, monopotassium phosphate, urea, ammonium phosphate and N:P:K: fertilizers provided that they withstand the temperature required for the crosslinking polymerization.

* * * * *